United States Patent [19]

Hooper et al.

[11] Patent Number: 4,756,860

[45] Date of Patent: Jul. 12, 1988

[54] APPARATUS FOR MANUFACTURING INSULATION PANELS

[75] Inventors: Walter J. Hooper, Plano; Gerald R. Bauer, Bedford; Carlos G. Bozas, Lewisville, all of Tex.

[73] Assignee: Rmax, Inc., Dallas, Tex.

[21] Appl. No.: 385,668

[22] Filed: Jun. 7, 1982

[51] Int. Cl.$^4$ .............................. B29C 43/22
[52] U.S. Cl. .................... 264/45.8; 156/459; 156/468; 264/46.2; 425/4 C; 425/224; 425/817 C
[58] Field of Search ............. 425/4 C, 817 C, 186, 425/224; 156/467, 468, 459, 92; 264/45.8, 46.2

[56] References Cited

U.S. PATENT DOCUMENTS

| | | | |
|---|---|---|---|
| 3,598,769 | 8/1971 | Hanton | 425/4 C |
| 3,793,122 | 2/1974 | Süllhöfer | 264/46.2 |
| 3,850,775 | 11/1974 | Bruneau et al. | 156/468 |
| 4,070,954 | 1/1978 | Cailey | 156/92 |
| 4,332,754 | 6/1982 | Meunier et al. | 264/46.2 |
| 4,385,090 | 5/1983 | Sims | 156/216 |

FOREIGN PATENT DOCUMENTS 0037173 10/1981 European Pat. Off. .......... 264/45.8

Primary Examiner—Jay H. Woo
Assistant Examiner—Timothy W. Heitbrink
Attorney, Agent, or Firm—Hubbard, Thurman, Turner & Tucker

[57] ABSTRACT

Plastic foam insulation panels are fabricated in a continuous elongated strip by an apparatus comprising upper and lower generally horizontally extending conveyors which form a support for the foam material during the expansion and solidification thereof. The thickness of the panel is determined by the vertical spacing between adjacent runs of the respective conveyors and the panel width is determined by spaced apart longitudinally extending sideplates which, together with the upper and lower conveyor runs define the cross-sectional dimensions of the insulation panel. The sideplates are mounted on laterally extending arms secured to spaced apart support stanchions and the position of the respective sideplates may be adjusted to vary the width of the panel.

10 Claims, 3 Drawing Sheets

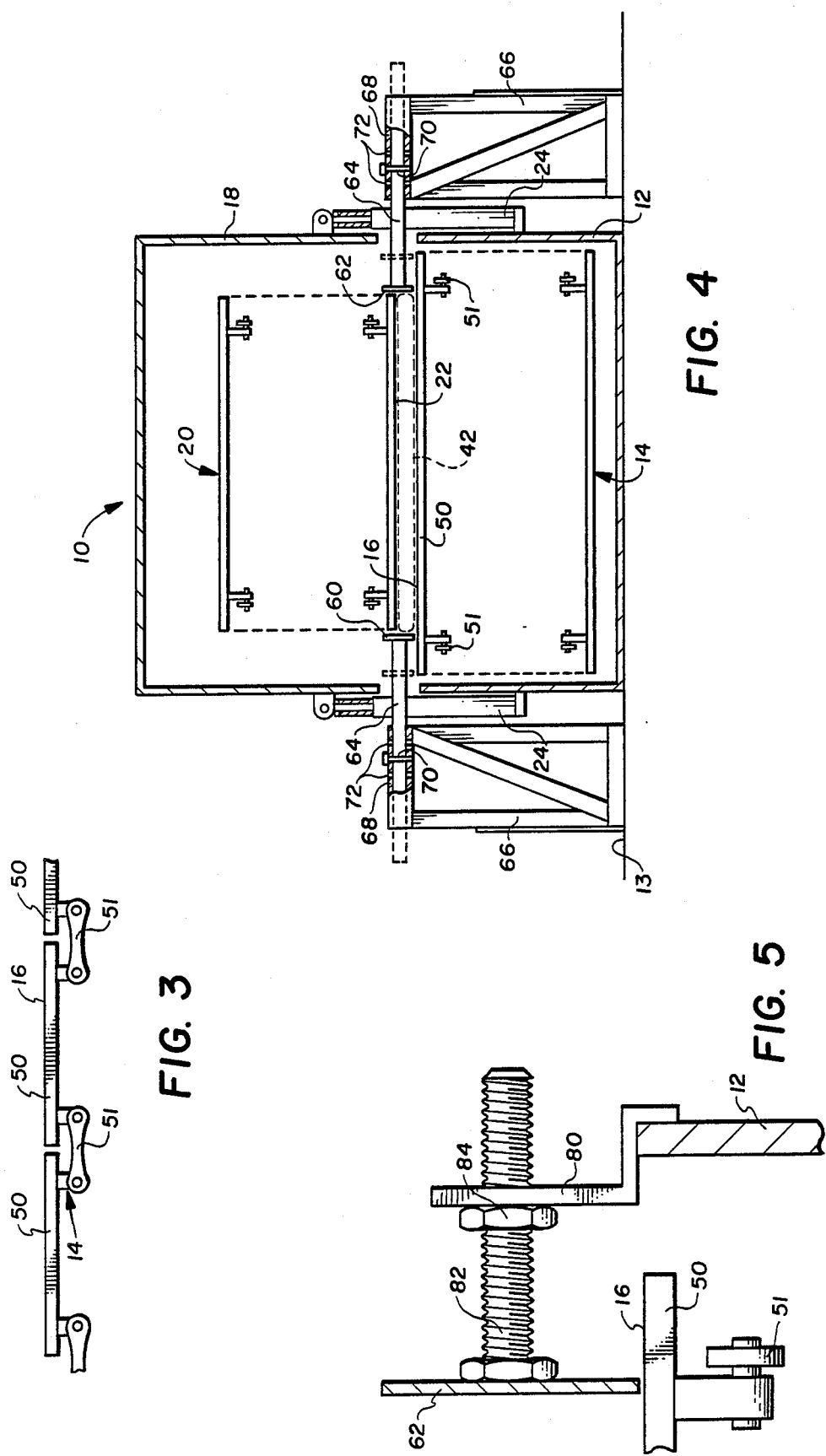

APPARATUS FOR MANUFACTURING INSULATION PANELS

BACKGROUND OF THE INVENTION

1. Field of the Invention

The present invention pertains to the manufacture of continuous lengths of expanded or foamed thermoplastic insulation panels of variable width using an apparatus which conveys continuous lengths of facing sheets between endless conveyor members to permit expansion of a plastic foam material between the facing sheets. The apparatus is provided with adjustable stationary sideplates disposed adjacent to the conveyor members to permit manufacture of continuous lengths of panel having a preselected width which may be varied in accordance with the spacing of the sideplates.

2. Background Art

In the art of manufacturing insulation panels comprising plastic foam material, fabrication apparatus is provided which comprises a pair of spaced apart horizontally extending linear conveyor members for controlling the expansion of the foam material and for supporting opposed facing sheets of selected material to form a variety of laminated panels. The fabrication process generally comprises feeding a facing sheet along and supported by one of the conveyors, applying the foam material in liquid form to the inside surface of the facing sheet and running a top facing sheet above the foam material and supported by the other conveyor. The apparatus must be of sufficient length to provide for a substantially complete expansion and setting of the foam material by the time it reaches the opposite end of the conveyor from the end at which the material was introduced. Such apparatus may be on the order of 70 to 80 feet in length and may also be provided with means for heating the foam material to assist in the expansion and setting process. The aforementioned apparatus is adapted to fabricate insulation panels in continuous lengths which are the cut to a predetermined panel size at the end of the conveyor system.

The arrangement of at least one type of prior art panel fabrication or lamination equipment includes the provision of a lower conveyor member formed by an endless chain or track having a series of flat plate links interconnected to form the endless conveyor. Each of the side-by-side plate members are provided with spaced apart upstanding side support plates for limiting the lateral expansion of the foam material and for supporting the lower panel facing sheet which may be wrapped around the longitudinal side edges of the panel in accordance with a preferred manufacturing process used by the assignee of the present invention. However, the fixed sideplates on the lower conveyor of the fabrication apparatus do not permit the fabrication of variable widths of insulation panels, increase the difficulty of cleaning the conveyor plates from time to time, and require additional power for translating the conveyor due to the added weight of the sideplates.

In the utilization of plastic foam insulation panels, it is desirable to provide panels of precise widths of various dimensions for various applications. For example, although edge wrapped plastic foam insulation panels have been widely accepted for various building construction applications, in certain uses of these panels it is necessary to trim the longitudinal edges of the panel to provide a precise edge for abutting a corresponding edge of an adjacent panel. Accordingly, prior art apparatus for manufacturing panels of a particular width are not easily adaptable to provide the added width needed to assure an adequate trimming margin to form the edges of the finished panels. Moreover, it is also desirable to provide panels of various widths for particular applications. In this respect, the present invention has resulted in a more versatile apparatus for fabricating foam insulation panels in a continuous process and has also resulted in several advantages related to the time and expense associated with maintaining and operating the fabrication equipment.

SUMMARY OF THE INVENTION

The present invention pertains to an improved apparatus for fabricating foam insulation panels wherein the panels are formed between two endless conveyors or the like to control the thickness of the panel and wherein the width of the panel may be preselected and may be varied in accordance with the desired application or end use of the panel.

In accordance with one aspect of the present invention, there is provided a panel fabrication or laminating apparatus having a pair of opposed, generally horizontally extending, endless conveyors spaced apart to control the thickness of an expanding chemical foam and including elongated spaced apart and parallel sideplates which define the width of the panel and which are adjustable with respect to each other in accordance with a desired preselected panel width. The sideplates are mounted on support members which are stationary with respect to the conveyors and are positioned directly above and adjacent to the upwardly facing lower conveyor.

By mounting the sideplates stationary with respect to the conveyors, the weight of the plates need not be borne by either of the conveyors and movement of the sideplates to change the preselected width of the panels may be easily accomplished. The sideplates are secured to laterally extending arms at spaced intervals along the conveyor run and the arms are slidably mounted in tubular sleeve members supported by spaced apart support stanchions. The position of the arms with respect to the supporting sleeves may be easily adjusted by cooperating locking pins or other suitable mechanism such as a rack and pinion or worm gear apparatus. The sideplates are also preferably provided with support members intermediate the spaced apart support arms and which serve to minimize lateral deflection of the sideplates due to expansion of the foam material or any tendency for the panel to undergo lateral excursion with respect to the conveyors.

In accordance with another aspect of the present invention, there is provided adjustable guide members at the inlet end of the conveyors, which guide members are mounted on the sideplates and are adjustable to provide for rolling the opposed edges of a lower panel facing sheet over and facing toward each other to form a wrapped edge of the insulation panel structure.

The present invention still further contemplates the process of manufacturing continuous strip foam insulation panel having single or opposed facing sheets wherein the panel is formed by running the facing sheet along a generally horizontal upward facing conveyor, allowing the foam to expand and solidify and controlling the width of the panel by providing stationary sideplates or guides which limit the lateral expansion of the foam. The width of the foam panel may be varied by selecting the spacing of the sideplates and the thickness of the panel may be varied by selecting the spacing between adjacent conveyor runs of two side-by-side endless conveyors. Accordingly, the cross-sectional dimensions of foam insulation panels may be varied conveniently without making structural changes to the endless conveyor members themselves.

In accordance with the improvements to the apparatus of the present invention and in accordance with the improved method of making a foamed insulation panel, maintenance of the panel fabrication equipment is also enhanced. Cleaning of the conveyor surface, for example, is easier to accomplish since the conveyor members themselves form a substantially flat unobstructed surface which is adaptable to utilizing a continuous cleaning member such as a rotary brush or the like. Moreover, the conveyor can be continuously cleaned while in operation.

The present invention further provides an insulation panel wherein the cosmetic appearance of the side edges of the panel is improved since the continuous planar surface of the sideplates allows the panel to form so that a continuous flat vertical edge of the panel is provided without indentations or disrupted surface. Moreover, the squareness of the panel is also improved by the stationary and continuous smooth surface provided by the sideplates.

In accordance with still a further aspect of the present invention, it has been determined that in the fabrication of foam insulation panels in a continuous strip the side supports for the panels are not required to extend throughout the entire length of the fabrication apparatus. Accordingly, savings in material and operating costs of the fabrication apparatus are realized since the stationary sideplates, which replace the movable sideplates on the conveyor chains, are not required to extend entirely along the length of a conveyor.

The abovenoted advantages and superior features of the present invention will be further appreciated by those skilled in the art upon reading the detailed description which follows in conjunction with the drawings.

BRIEF DESCRIPTION OF THE DRAWINGS

FIG. 3 is a detail side elevation of one of the conveyors of the apparatus illustrated in FIGS. 1 and 2.

FIG. 4 is a section view taken along the line 4—4 of FIG. 2;

FIG. 5 is detail section view taken along the line 5—5 of FIG. 2;

DESCRIPTION OF THE PREFERRED EMBODIMENT

In the description which follows, like parts are marked throughout the specification and drawings with the same numerals, respectively. The drawings are not necessarily to scale and the scale of certain parts may be exaggerated to better illustrate the features of the invention.

Figure 1:
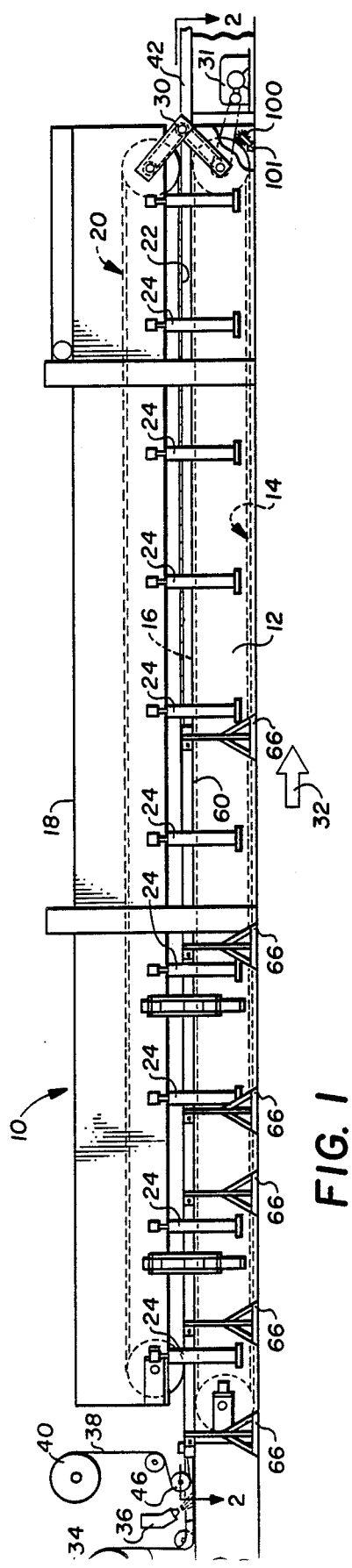
FIG. 1 is a side elevation of an improved insulation panel fabrication apparatus in accordance with the present invention.
Figure 2:
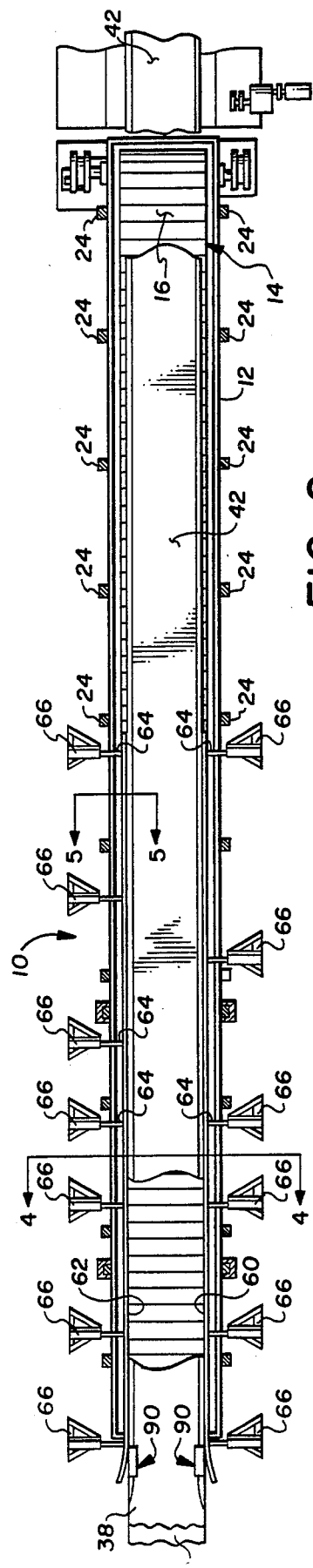
FIG. 2 is a plan view of the apparatus taken generally along line 2—2 of FIG. 1.

Referring to FIGS. 1 and 2, there is illustrated an apparatus for manufacturing a continuous strip of foam insulation panel, which apparatus is generally designated by the numeral 10. The apparatus 10 includes a lower frame section 12 which is adapted to support an endless conveyor 14 having a generally horizontal run 16 forming a support surface for transporting an insulation panel from an inlet end of the apparatus to a discharge end. The apparatus 10 further includes an upper frame section 18 adapted to support a second endless conveyor 20 arranged to have a generally horizontally extending downwardly facing run 22 spaced vertically from the conveyor run 16. The upper frame section 18 is supported by a series of spaced apart hydraulic jacks 24 comprising cylinder and piston type actuators which are arranged along each side of the frame section 12 and suitably secured to both the upper and lower frame sections. The apparatus 10 also includes drive means, generally designated by the numeral 30, including a motor 31 and suitable mechanism for driving the conveyors 14 and 20 in timed relationship to each other so that the runs 16 and 22 translate in the direction of the arrow 32 in FIG. 1. By suitable adjustment of the jacks 24, the vertical spacing between the runs 16 and 22 may be selected to vary the thickness of a foam insulation panel that is fabricated in a manner to be described herein.

The inlet end of the apparatus 10 is adapted to provide facing means for supporting a quantity of liquid chemical foam which reacts with an agent to expand and solidify into a substantially rigid cellular structure which is particularly useful as an insulation material or the like. The facing material, if desired to be a permanent part of the panel, is provided by a roll 34 of facing sheet 35 which may be a metal foil or other suitable material such as heavy paper, felt or the like. The facing sheet 35 is arranged to be paid out and supported along the conveyor run 16 in timed relationship with the surface speed of the conveyor run. Suitable dispensing means 36 is provided for dispensing one or more continuous streams of chemical foam such as poly-isocyanurate onto the inside or upwardly facing surface of the facing sheet 35. An upper facing sheet 38 may be provided for the panel to be formed by providing a second roll of facing material 40 which is also dispensed in timed relation to the dispensing from the roll 34 and at the speed of the conveyor runs 16 and 22. A leveling roller 46 is mounted at the inlet to the apparatus 10, as shown in FIG. 1, and provides for squeezing the quantity of foam dispensed onto the facing sheet 35 between the upper and lower sheets to evenly distribute the foam across the width of the sheets as they are continuously fed into the apparatus 10. As the facing sheets are continuously fed through the apparatus with the foam material sandwiched therebetween, a chemical reaction is effected causing the foam to expand and to become rigid thereby forming a panel having a thickness determined by the vertical spacing between the conveyor runs 16 and 22. As the continuously formed panel 42 emerges from the opposite end of the apparatus 10, the foam has solidified or cured to form a substantially rigid member which is continuously cast or foamed-in-place on the conveyors. The panel strip may be cut into prescribed lengths in accordance with the required usage. The apparatus 10 may also be provided with suitable heating means to expedite the curing of the foam material. However, such structure forms no part of the present invention and will not be described in detail herein.

Referring briefly to FIG. 3, by way of example, the conveyor 14 typically comprises a series of generally flat plate members 50 which are provided with suitable linkage means 51 so as to be interconnected and form a generally planar upwardly facing surface comprising the conveyor run 16. The plate members 50 are interconnected to form an endless conveyor chain or track not unlike that used in so-called track laying vehicles. The plates 50 are suitably supported along the frame section 12 by spaced apart idler roller means, not shown, and are trained over suitable sprockets disposed at each end of the frame section. The conveyor 20 is similarly constructed.

Figure 7:
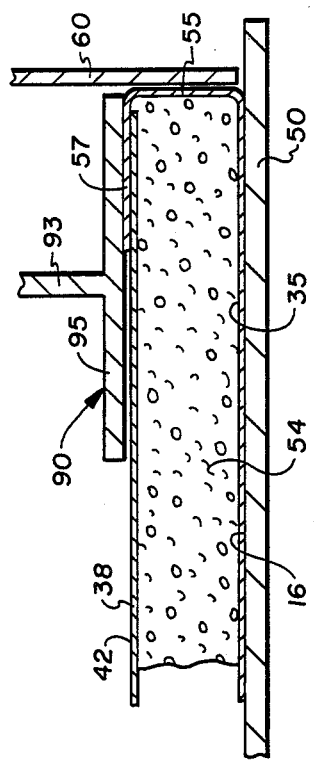
FIG. 7 is a detail cross-sectional view taken along line 7—7 of FIG. 6 and showing one form of insulation panel being fabricated by the apparatus of the present invention.

Referring briefly to FIG. 7, a partial cross-section of one form of insulation panel which can be fabricated using the apparatus 10 is shown by way of example. The insulation panel 42 comprises a foam core portion 54, bottom facing sheet 35 and top facing sheet 38. In accordance with an improved type of insulation panel manufactured by the assignee of the present invention, the facing sheet 35 is formed to have a width sufficient such that opposed longitudinal edges of the sheet extend beyond the longitudinal side edges 55 of the core 54 and are folded to overlap a portion of the upper facing sheet as indicated at 57 in FIG. 7. Only one longitudinal edge of the core 54 is shown in the drawing figure but the opposite edge of the sheet 35 is folded in the same manner. Although the preferred form of the insulation panel 42 may be fabricated by the apparatus 10, it is not necessary, in accordance with the present invention, to provide the so-called edge wrapped panel as illustrated. In fact, the modified apparatus and method in accordance with the present invention is operable to manufacture a panel having neither an upper or lower facing sheet, although a lower temporary facing member normally must be provided as a support surface for the liquid foam.

In accordance with prior art apparatus for making foam panels generally as described above, the plates 50 were each provided with spaced apart upstanding sideplate segments. However, with the present invention, these sideplates have been eliminated and guide means have been provided for determining the width of an insulation panel such as the panel 42 which may be preselected and varied at least between the width of the plates of the upper conveyor 20 and the lower conveyor 14. As illustrated in FIGS. 1, 2 and 4, the apparatus 10 is provided with a pair of spaced apart continuous sideplates 60 and 62 which extend from the inlet end of the apparatus 10 substantially therealong to a point approximately midway between the ends of the apparatus. The sideplates 60 and 62 are adapted to be selectively positioned with respect to each other just above the upper surface of the plates 50 of the conveyor run 16 and are stationary with respect to the conveyor. The sideplates 60 and 62 are each preferably formed as a continuous metal plate, preferably of stainless steel or the like. In accordance with one embodiment of the present invention, the plates 60 and 62 are formed of stainless steel plate of approximately 0.375 inches thickness, 3.5 inches height and 45 feet long.

The plates 60 and 62 are supported at horizontally spaced intervals along the conveyor run 16 by generally laterally extending arms 64 which are supported in spaced apart support members or stanchions 66. The stanchions 66 are each provided with a generally horizontally extending tubular member 68 for receiving the arms 64 in telescopingly slidable relationship, as shown in FIG. 4, in particular. The arms 64 may be selectively positioned with respect to the stanchions 66 by respective locking pins 70 which are adapted to be interfitted in one of selected spaced apart holes 72 formed in the tubular member 68 and also passing through a cooperating hole in the arm 64. Any number of holes 72 may be provided and spaced apart from each other in accordance with the selected dimensions of the spacing of the plate members 60 and 62. The stanchions 66 are adapted to be suitably fixed to the lower frame section 12 or to a floor structure 13 for supporting the apparatus 10, as indicated in FIG. 4.

The stanchions 66 are spaced apart at preselected intervals in accordance with the requirements for supporting the plates 60 and 62 and also to accommodate the structure of the apparatus 10. Accordingly, it is desirable to provide secondary support means for the plates 60 and 62 to minimize the deflection of the plates due to expansion of the foam material. Referring to FIG. 5, one portion of the secondary support means for the sideplate 62 is illustrated and comprises a support bracket 80 suitably mounted on the lower frame section 12 and supporting a generally horizontally extending bolt 82 which is threadedly engaged with the bracket and with a locknut 84, as shown. The bolt 82 may be adjusted to engage the backside of the sideplate 62 in supportive relationship thereto to minimize lateral deflection of the plate at points between the support arms 64. The arrangement illustrated in FIG. 5 is typically provided for both sideplates 60 and 62 at points approximately midway between the stanchions 66.

Figure 6:
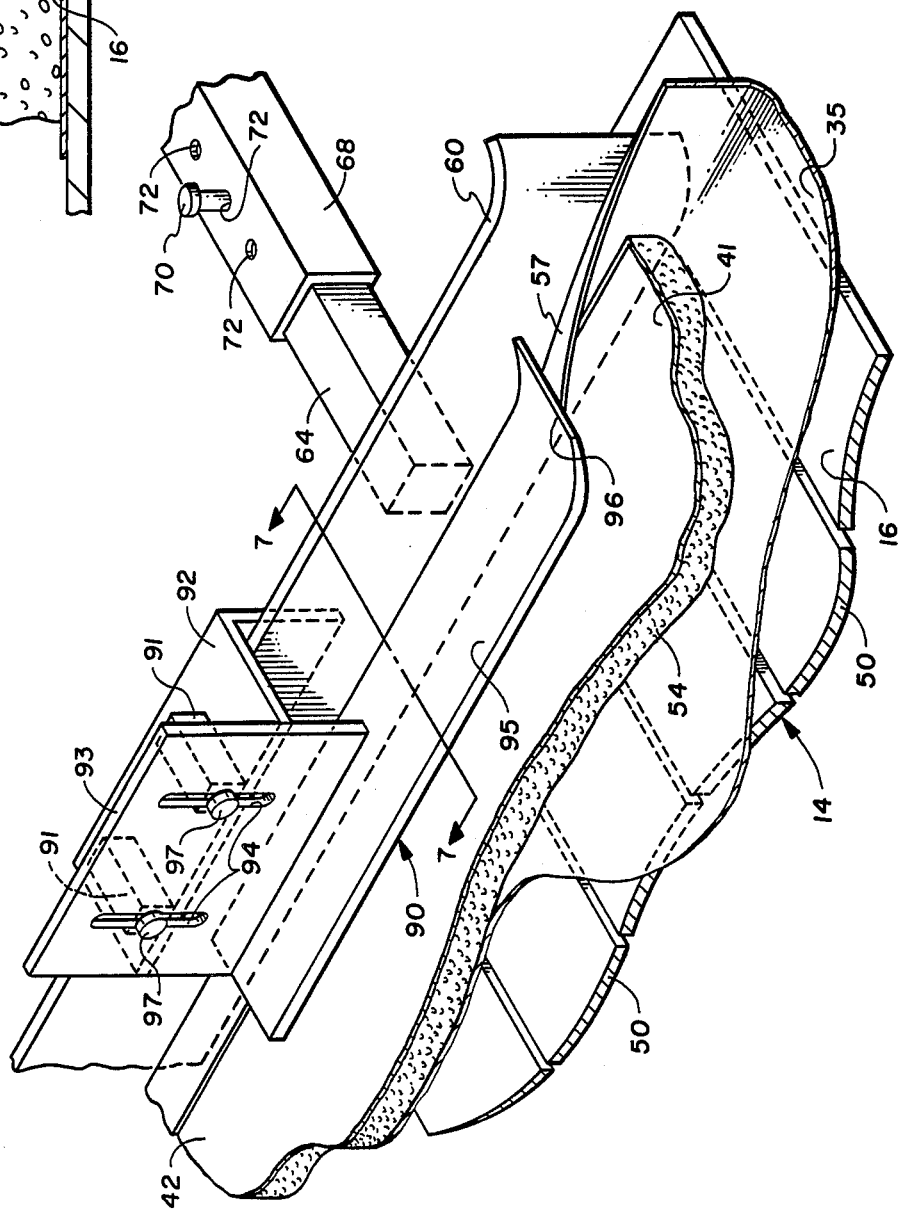
FIG. 6 is a detail perspective view of one of the facing sheet guides used in conjunction with the improved apparatus of the present invention.

In one preferred process for fabricating insulation panels in accordance with the present invention, and utilizing the apparatus 10, the edges of the foam core 54 are enclosed by folding the lower facing sheet over the edge of the core so that the opposed edges 57 of the facing member extend toward each other and overlay the opposed edges of the upper facing sheet 38, as previously described. A suitable adhesive may be applied between the upper surface 41 of the facing sheet 38 and the sheet edges 57 to bond the edges to the facing sheet. Referring now to FIGS. 2, 6 and 7, the apparatus 10 is provided with a pair of spaced apart edge guide members, generally designated by the numeral 90, for guiding the opposed lateral edges of the facing sheet 35 to a folded over position as the facing sheet is fed off of the roll 34 and between the conveyors 14 and 20. The guide members 90 are suitably secured to the spaced apart sideplates 60 and 62 near the leading edge of the sideplates. As shown in FIG. 6, by way of example, each of the guide members 90 includes a bracket 92 suitably secured to the sideplate 60, for example, and having a vertically disposed portion 93 provided with two spaced apart elongated slots 94. A generally horizontally extending guide shoe 95 is suitably secured to the bottom edge of the bracket portion 93 and includes an upwardly flared leading edge 96. The bracket portion 93 is vertically adjustably mounted on the bracket 92 by spaced apart threaded fasteners 97 extending through the slots 94 and secured in respective tapped holes formed in support blocks 91 mounted on the bracket 92. Accordingly, the vertical position of the shoe 95 may be adjusted in accordance with characteristics of the facing sheets and the thickness of the panel being fabricated.

As the opposed edges 57 of the lower facing sheet 35 approach the shoes 95, the edges are generally vertically extending. However, as the edge of the facing sheet engages the leading edge 96, it is folded down and toward the opposite edge of the facing sheet, which in turn is being folded by the other of the guides 90. The guides 90 may be identical in construction and a left or right hand guide is formed by merely reversing the position of the shoe 95 with respect to the bracket 92.

In accordance with the improved process of forming edge wrapped insulation panels, the width of the panels is preselected by adjusting the position of the plates 60 and 62 with respect to each other and with respect to the lower run 16 of the conveyor 14. The upper frame section 18 is also suitably adjusted by the jacks 24 to determine the thickness of the panel as selected by the vertical spacing between the conveyor runs 16 and 22. The intermediate support members 82 for the plates 60 and 62 are also adjusted to assure that the plates are generally parallel and straight throughout their length. The facing sheets 35 and 38 may then be trained through the apparatus and a quantity of foam injected onto the upwardly facing surface of the facing member 35 while the conveyors 14 and 20 are driven in timed relationship to each other to commence feeding foam laden facing members through the apparatus. The opposed edges 57 of the lower facing member are, of course, initially folded over so that they can be continuously folded and guided by the shoes 95.

If it is desired to adjust the width of the panel being fabricated, it is merely necessary to move the sideplates 60 and 62 toward or away from each other while preferably maintaining the space between the plates generally centered with respect to the lateral width of the conveyors. It may be necessary to provide the lower facing sheet of a suitable width to provide the wrapped edge feature if this is desired. However, the arrangement for determining the width of the foam core 52 does not require that the lower facing sheet be folded or wrapped over the lateral edges of the foam core. Moreover, the lower facing sheet may be a temporary support for forming foam cores which do not have an upper or lower facing member whereby the foam panel is essentially continuously cast by the apparatus 10. In the drawing FIGS. 6 and 7, the foam core is shown partially expanded at the point where the facing sheets pass through the guides 90. Normally, the major portion of foam expansion occurs further downstream in the direction of movement of the panel during the fabrication process and the thickness of the foam is exaggerated somewhat in the drawing figures for illustration purposes only.

By the ease of adjustment of the sideplate 60 and 62, panels of preselected width may be easily fabricated to essentially any dimension within the range provided by the support arms 64 and delimited only by the width of the lower conveyor 14. Thanks to the provision of the stationary sideplates 60 and 62 which are not required to be supported on either of the conveyors 14 or 20, the power requirements for driving the conveyors is reduced and the ease of cleaning the conveyors, as needed, is greatly enhanced.

With respect to the last mentioned advantage described hereinabove, and referring to FIG. 1, the apparatus 10 may be adapted to include conveyor cleaning means comprising, for example, a rotary brush, generally designated by the numeral 100, suitably supported with respect to the lower conveyor 14 for continuously engaging the surfaces of the plates 50 to remove any foam material or facing member material which may become stuck to the plates as a result of the panel fabrication process. The brush 100 may be continuously engaged with the conveyor or may be swung into or out of engagement as needed for cleaning the conveyor surface. The rotary brush 100 may be driven in the opposite direction with respect to the direction of movement of the conveyor by suitable drive mechanism 101, or in the same direction at a lower linear surface speed than the surface speed of the conveyor. The drive mechanism 101 may include suitable clutch means for allowing the brush 100 to free wheel when not being used to clean the conveyor 14. A similar conveyor cleaning device, not shown, may be provided for the conveyor 20.

Those skilled in the art will appreciate from the foregoing description that various substitutions and modifications to the apparatus and method herein described may be made without departing from the scope and spirit of the invention as recited in the appended claims.

What we claim is:

1. In an apparatus for forming a continuous strip of foam insulation panel, said panel having upper and lower facing sheets and a core of rigid plastic foam between said sheets, said lower facing sheet being wider than said upper facing sheet and being folded upwardly along opposite longitudinal edges to form wrapped side edges of said panel;

a first frame section for supporting a first generally horizontally extending endless conveyor having a first upward facing conveyor run for supporting and transporting said panel during the formation thereof;

a second frame section for supporting a second generally horizontally extending endless conveyor having a second downward facing conveyor run and defining the thickness of said panel, the width of said second conveyor run being less than the width of said first conveyor run;

means for adjusting the position of said second conveyor run relative to said first conveyor run to define the thickness of said panel;

means for dispensing said facing sheets at one end of said conveyors;

means for dispensing liquid foam between said sheets;

a pair of opposed elongated panel edge guide plates extending along and just above the surface of said first conveyor run from a point adjacent to said one end in a direction toward the other end of said first conveyor run and extending over a major portion of said first conveyor run on which expansion and solidification of said plastic foam occurs for engaging said lower facing sheet along said portions forming said wrapped edges of said panel and defining the width of said panel;

said guide plates extending vertically upward to a point adjacent the opposite side edges of said second conveyor run and wherein said second conveyor run is disposed between said guide plates so that the entire side edges of said panel are formed substantially flat, parallel, and perpendicular to upper and lower faces of said panel; and support means for said guide plates for preventing lateral deflection of said guide plates during the expansion of said foam to control said width of said panel as the folded lower facing sheet slides along said guide plates.

2. The apparatus set forth in claim 1 wherein:
said support means for said guide plates includes means for selectively adjusting the spacing between said guide plates from a distance corresponding to a selected standard panel width to a greater distance whereby said apparatus can alternately fabricate panels of standard width having wrapped edges and panels of slightly greater width having wrapped edges which can then be trimmed to form panels of standard width with cut, unwrapped edges.

3. The apparatus set forth in claim 1 including:
opposed facing sheet guide shoes at the end of said guide plates adjacent said levelling means for engaging said opposite longtudinal edges of said lower facing sheet, respectively, and continuously folding said opposite longitudinal edges over toward each other and onto a top surface of said panel as said panel is being formed; and
means for adjusting the position of each of said guide plates and said guide shoes with respect to the other of said guide plates and said guide shoes and with respect to said first conveyor to form said side edges in accordance with a preselected width of said panel.

4. The apparatus set forth in claim 3 wherein:
said guide shoes, comprise elongated plates mounted on respective ones of said guide plates and facing said first conveyor run.

5. Apparatus for forming a continuous strip of generally planar foam insulation panel having a predetermined width, said panel having upper and lower facing sheets and a core of rigid plastic foam between said sheets, one of said sheet having opposed edges which are foled to form opposed side edges of said panel during the formation thereof, said apparatus comprising:
a first frame section supporting a first generally horizontally extending conveyor having an upward facing conveyor run for supporting and transporting said panel during the formation thereof;
means for dispensing said facing sheets generally at one end of said first conveyor;
means for dispensing liquid foam between said sheets at a predetermined point relative to said first conveyor;
guide means comprising a pair of opposed elongated panel edge guide sideplates extending along and above opposed sides of said first conveyor from a point just downstream of said predetermined point with respect to the direction of movement of said facing sheets toward the other end of said first conveyor for directly engaging said one facing sheet along said portions forming said side edges of said panel and defining the width of said panel and extending over a length portion of said first conveyor to provide sufficient solidification of said plastic foam so as to maintain said width of said panel; and
support means for said sideplates for supporting said sideplates stationary with respect to said first conveyor and for preventing lateral deflection of said sideplates during the formation of said panel to control said width of said panel as said side edges of said one facing sheet slide along said sideplates.

6. The apparatus set forth in claim 5 wherein:
said sideplates are formed of continuous plates of stainless steel.

7. The apparatus set forth in claim 5 wherein:
said support means comprises a series of spaced apart support members associated with each of said sideplates, an arm associated with each of said support members and connected to one of said sideplates, said arms being adjustable with respect to said support members, respectively, for adjusting the position of said sideplates with respect to said first conveyor.

8. The apparatus set forth in claim 7 wherein:
said support means includes a plurality of support brackets disposed along said first frame section between selected ones of said support members and including a member adjustably mounted on said support brackets, respectively, for preventing lateral deflection of said sideplates due to expansion of said foam.

9. The apparatus set forth in claim 7 wherein:
said apparatus includes a second frame section for supporting a second endless conveyor having a second downwardly facing conveyor run disposed above and substantially coextensive with said first conveyor run at least along said portion including said guide means.

10. The apparatus set forth in claim 9 wherein:
said sideplates are of a height sufficient to extend vertically between said second conveyor run to a point just above said first conveyor run.

* * * * *